United States Patent [19]
Walker, Jr.

[11] Patent Number: 5,474,438
[45] Date of Patent: Dec. 12, 1995

[54] ADJUSTABLE BACK PLATE FOR A MOLD

[76] Inventor: John T. Walker, Jr., 15 Lakeview Ave., Dudley, Mass. 01571

[21] Appl. No.: 136,658
[22] Filed: Oct. 14, 1993
[51] Int. Cl.⁶ .................................................. B29C 45/66
[52] U.S. Cl. ...................... 425/185; 425/190; 425/192 R; 425/525
[58] Field of Search ............................. 425/185, 190, 425/191, 192 R, 182, 525, 195

[56] References Cited

U.S. PATENT DOCUMENTS 4,551,084  11/1985  Lake .......................................... 425/185

Primary Examiner—Tim Heitbrink
Attorney, Agent, or Firm—Iandiorio & Teska

[57] ABSTRACT

An adjustable back plate for a mold including a mold body block and a neck block, the adjustable back plate including a pocket in the back plate for aligning an oversized neck block with the mold body block and a neck block adjustment mechanism which operates in the pocket to align an undersized neck block with the mold body block.

22 Claims, 5 Drawing Sheets

ADJUSTABLE BACK PLATE FOR A MOLD

FIELD OF INVENTION

This invention relates to an adjustable back plate for a mold which allows the neck block of the mold to be correctly aligned as well as providing adjustment of the back plate with respect to the platen of a blow molding machine.

BACKGROUND OF INVENTION

Plastic containers are ubiquitous. They are manufactured for distributing and selling milk, juice, soda, and other products as well as for ornamental consumer products. Blow molding is the primary manufacturing process for forming beverage containers. An aluninum mold is used which includes a mold body block and a removable neck block for forming the top (sometimes threaded) portion of the container. The neck block is removable from the mold body block since one user may desire a screw cap, another a snap screw cap, while another may want a snap cap and each type of cap requires a different kind of neck block.

Each half of the mold is mounted to a back plate which in turn is mounted to the platen of the blow mold machine. The opposing platens are driven towards each other bringing each half of the mold together. A tube of plastic called a parison is then extruded between the mold halves and then blown out into the mold to form a container. The platens are then drawn apart and the container is removed from the mold, trimmed, and inspected for quality. There may be one to as many as six or more molds per blow machine and the blow machine cycles as often as every six seconds producing up to approximately six hundred containers in an hour.

Sometimes, the neck blocks are not manufactured to the same dimensions as the mold body blocks. Also, the aluminum molds wear and when they do, they must be refurbished. The neck blocks are removed and, after refurbishing (removing material) the mold, the neck block is remounted to the refurbished mold body block. This assembly is then mounted to the back plate and the neck block must be carefully aligned with respect to the mold body block. To accomplish this, sometimes shims are placed under the mold body block to adjust the difference in heights between the standard neck block and the refurbished mold body block. As much as 0.0005" misalignment between the neck block and the mold body block can severely affect quality. Manual shimming of the neck block is time consuming, labor intensive and often unreliable. If the neck block is not correctly aligned with respect to the mold body block, trimming flash from the container can become difficult if not impossible. In most cases, the neck block becomes too large for the refurbished body block. In this situation, shims won't work since the neck block actually needs to be set back on or into the back plate. This would require machining the neck block which is impractical in light of its interchangable value, or alternatively, machining the individual back plate which is also impractical because of the labor required.

Moreover, each half of the mold must be vertically aligned to precisely mate with the other half when the molds are brought together. Also, vertical alignment is necessary to align the molds with the blowing nozzle or blow pin of the blow machine.

Remarkably, this is often accomplished by snugly securing the back plate to the platen with the mold attached and then striking the back plate in the direction the mold is needed to be moved. The mold is visually positioned and then the back plate is torqued to the platen. This can damage the back plate and often results in misalignment between the molds halves.

Accordingly, manually aligning the neck block with respect to the body block of the mold and vertically aligning the mold halves on the platens is a time consuming and imprecise process.

SUMMARY OF INVENTION

It is therefore an object of this invention to provide an adjustable back plate for a mold.

It is a further object of this invention to provide such an adjustable back plate which eliminates the need to shim the neck block or mold body blocks with respect to the back plate.

It is a further object of this invention to provide such an adjustable back plate which allows more precise alignment of the back plate and hence the mold on the platen.

It is a further object of this invention to provide such an adjustable back plate which facilitates precise alignment of the neck block and the mold and reduces the number of man hours required for alignment after a mold is refurbished.

It is a further object of this invention to provide such an adjustable back plate which can be vertically aligned on the platen without damaging the back plate.

It is a further object of this invention to provide such an adjustable back plate which allows alignment of a neck block which is larger or smaller than the body block.

This invention results from the realization that if a neck block adjustment mechanism is incorporated with the back plate, the need to shim the neck block or mold body block with respect to the back plate or to machine the neck block is eliminated and the further realization that the need to strike the back plate to correctly position it vertically on the platen can be eliminated by further incorporating a vertical adjustment mechanism on the back plate which allows more precise alignment of the back plate (and hence the mold) on the platen.

This invention features an adjustable back plate for a mold including a mold body block and a neck block. The adjustable back plate includes a neck block adjustment mechanism and means for guiding the neck block adjustment mechanism for aligning the neck block with respect to the mold body block.

The adjustable back plate may include a pocket in the back plate behind the neck block and a slide assembly receivable within the pocket. The slide assembly includes a pocket insert and means for positioning the insert in a plurality of positions along the length of the pocket behind the neck block. The insert maybe a tapered plate and there may be a driving rod or screw receivable within the pocket for urging said tapered plate behind the neck block.

The adjustable back plate may further include means for vertically adjusting the back plate with respect to a platen such as one or more channels within the plate and a shaft extendable within the channel for bearing on a fastener through the channel. There may be a recess about the channel for providing clearance for a fastener though the channel in the case of a mold which includes a cam lock system. A bearing surface such as a contact shoe on the distal end of the shaft in the channel provides vertical adjustment of the back plate on the platen.

This invention also features an adjustable back plate comprising neck block adjustment means for aligning the neck block with respect to the mold body block and means for adjusting the back plate with respect to a platen.

The neck block adjustment means includes a pocket in the back plate behind the neck block for receiving the neck block and offsetting it therein for aligning oversized neck blocks with the mold body block. The neck block adjustment means further includes an adjustable tapered plate movable within the pocket for lifting the neck block with respect to the back plate for aligning undersized neck blocks with the mold body block.

This invention also features an adjustable back plate including a neck block adjustment mechanism including means for offsetting the neck block relative to the plane of the back plate. The adjustable back plate may further include a vertical adjustment mechanism for vertically adjusting the back plate with respect to a platen. A pocket machined in the front mold contact surface of the back plate allows the neck block to be set back in the back plate. In this embodiment, the neck block adjustment mechanism is disposed to operate within the pocket.

BRIEF DESCRIPTION OF DRAWINGS

Other objects, features and advantages will occur to those skilled in the art from the following description of a preferred embodiment and the accompanying drawings, in which.

DISCLOSURE OF PREFERRED EMBODIMENT

Figure 1:
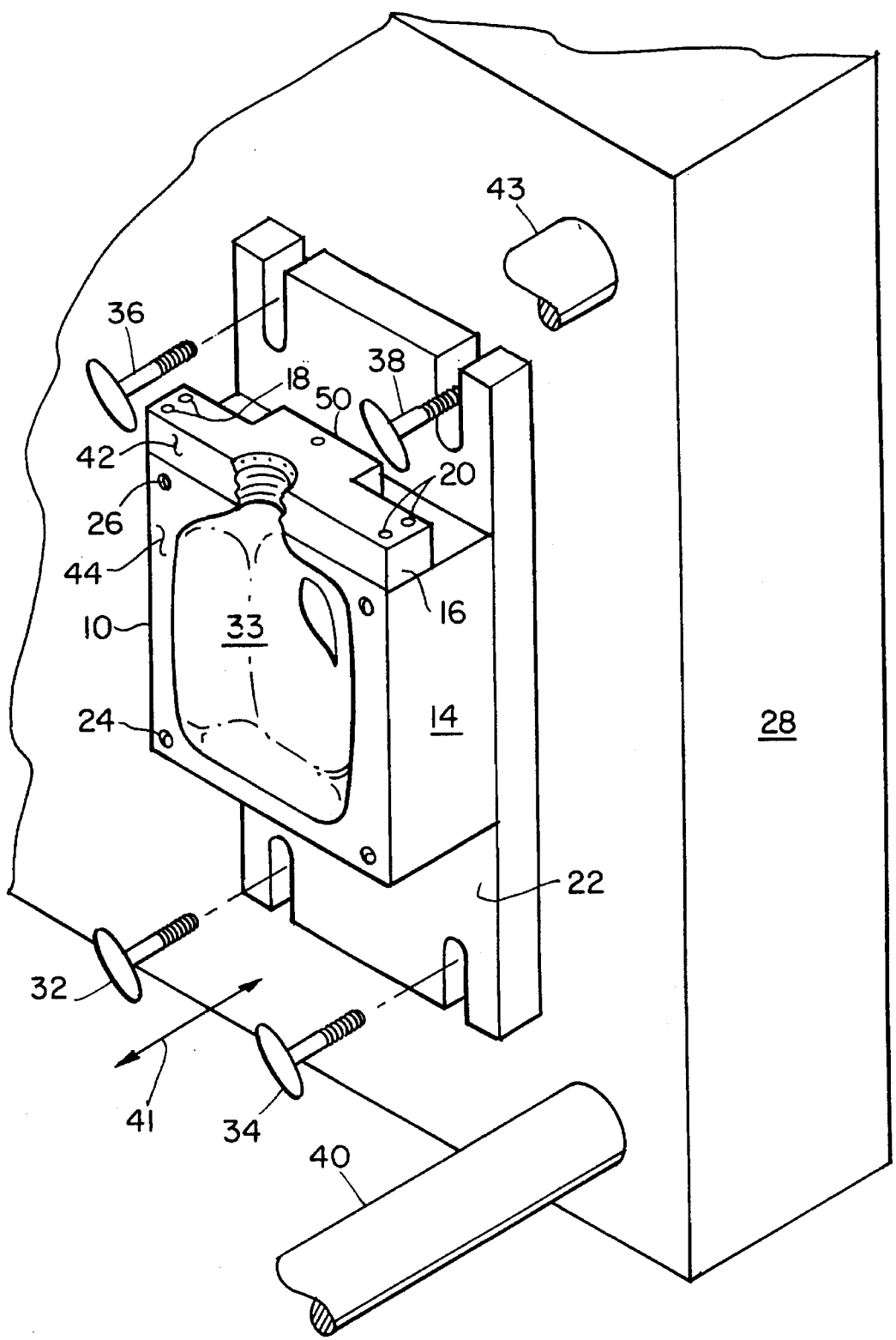
FIG. 1 is a schematic diagram of one half of a blow molding machine showing a prior art back plate.

The adjustable back plate of this invention is useful as a sub assembly for a blow molding machine, a portion of which is shown in FIG. 1. Mold 10 includes mold body block 14 and removable neck block 16. Neck block 16 is removable since some containers have a screw top while others have a snap top and each type of neck sometimes requires a different kind of neck block. Neck block 16 is secured to body block 14 by means of fasteners 18, 20, etc.

Mold 10 is mounted on back plate 22 by means of fasteners 24, 26, etc. Back plate 22, in turn, is mounted on platen 28 by means of fasteners 32, 34, 36, and 38. Hydraulic pistons 40 and 42 bring platen 28 towards a similarly configured platen in the direction shown by arrow 41 thereby bringing the mold halves together for blow molding.

Two alignments are critical. First is the correct adjustment of neck block 16 on mold body block 14. Front face 43 of neck block 16 should correctly align with respect to the front face 44 of mold body block 14. Otherwise, trimming flash can be difficult if not impossible. Second, mold 10 must be aligned vertically to correctly mate with the other half of the mold and also vertically aligned with respect to the blowing nozzle (not shown) of the blow machine.

Prior art back plate 22 is adjusted vertically by inserting fasteners 32, 34, 36, and 38, and snugly securing back plate 22 against platen 28. A worker then strikes the top or bottom of the back plate to move it up or down. This can and often does damage the back plate and also results in imprecise vertical alignment of mold 10.

Also, prior art back plate 22 does not lend it self to alignment of neck block 16 with respect to body block 14. Instead, a shim is placed in the interface area 50 between the neck block 16 or tinder the mold body block 14 and back plate 22. This is an imprecise and labor intensive alignment method. Moreover, if the neck block is larger than the refurbished body block, shimming the body block will not always work sufficiently since other problems may occur in the molding process. Instead, the neck block must be set back in a specially machined back plate or the neck block itself must be machined.

Figure 2:
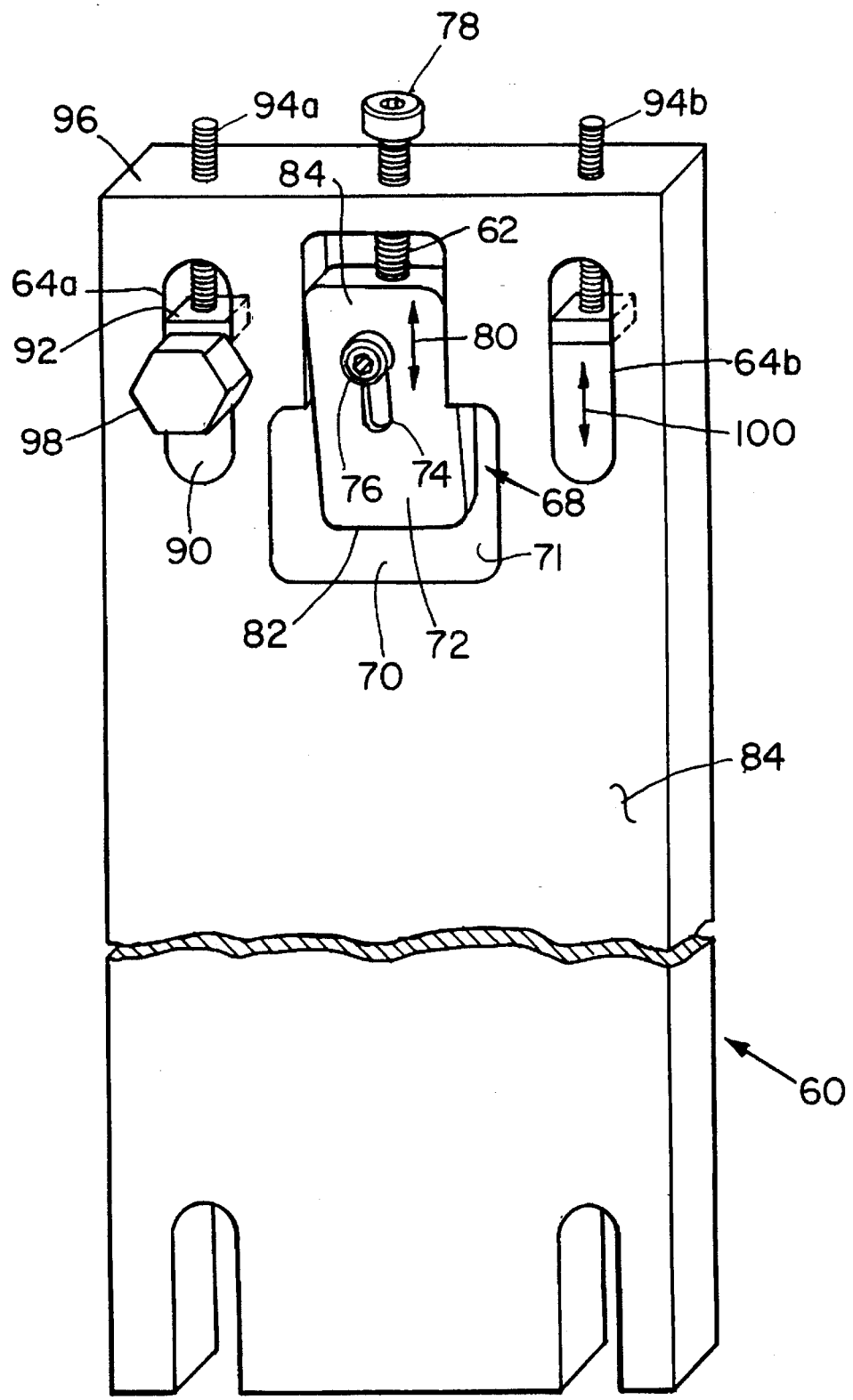
FIG. 2 is a front view of the adjustable back plate according to this invention.

Back plate 60, FIG. 2, according to this invention, however, solves both problems. Neck block adjustment mechanism 62 aligns the neck block with respect to the mold body block and vertical adjustment mechanism 64a and 64b allows vertical adjustment of the back plate with respect to the platen and blow pin. Pocket 70 guides neck block adjustment mechanism 62 for aligning the neck block with respect to the mold body block and also allows the neck block to be set back in back plate 60 if needed for oversized or trader sized neck blocks.

Neck block adjustment mechanism 62 includes slide assembly 68 which is received in pocket 70 located in front mold contact surface 84 of back plate 60. An insert in the form of a tapered plate 72 includes slot 74 for receiving fastener 76 thereby mounting tapered plate 72 in pocket 70. Adjustment bolt 78 moves tapered plate 72 within pocket 70 in the direction shown by arrow 80. Pocket 70 has a broad portion in the area shown at 71 for receiving the back of the neck block in case it must be set back in the back plate. This occurs when the neck block is too large for the body block.

Tapered plate 72 is thin at bottom edge 82 and tapers up to its thickest portion at top edge 84. Therefore, when adjustment bolt 78 is brought down to engage tapered plate 72 moving tapered plate 72 downward, thicker portions of tapered plate 72 are brought to bear upon neck block 16, FIG. 1, moving it away or lifting the top surface of the slide from back plate 60. This adjusts the position of the neck block relative to the front mold contacting surface 84 of back plate 60. The effect is precise alignment of neck block 16, FIG. 1 with respect to the mold body block 14 eliminating the need to manually shim the neck or body block. Or, tapered plate 72 can be retracted in pocket 70 and then the neck block will set back in broad portion 71 of pocket 70 to accommodate neck blocks which are too large for the body block.

Vertical adjustment mechanism 64 includes closed-ended channel 90 in back plate 60 and a bearing surface such as bolt contacting shoe 92. Shaft 94a is threaded through the top portion 96 of back plate 60 to bear shoe 92 down upon bolt 98 which is used to affix back plate 60 to platen 28, FIG. 1. A similar vertical adjustment mechanism is shown on the other side of back plate 60 as vertical adjustment mechanism 64b. Bolt 94b is movable in closed ended channel 90 in the direction shown by arrow 100 to move back plate 60 with mold up and down with respect to platen 28, and the blow pin of the blow molding machine, FIG. 1. This eliminates the need to strike the back plate to adjust it vertically on the platen. Instead, bolts 94a and 94b are adjusted and this vertically aligns the back plate on the platen.

Figure 3:
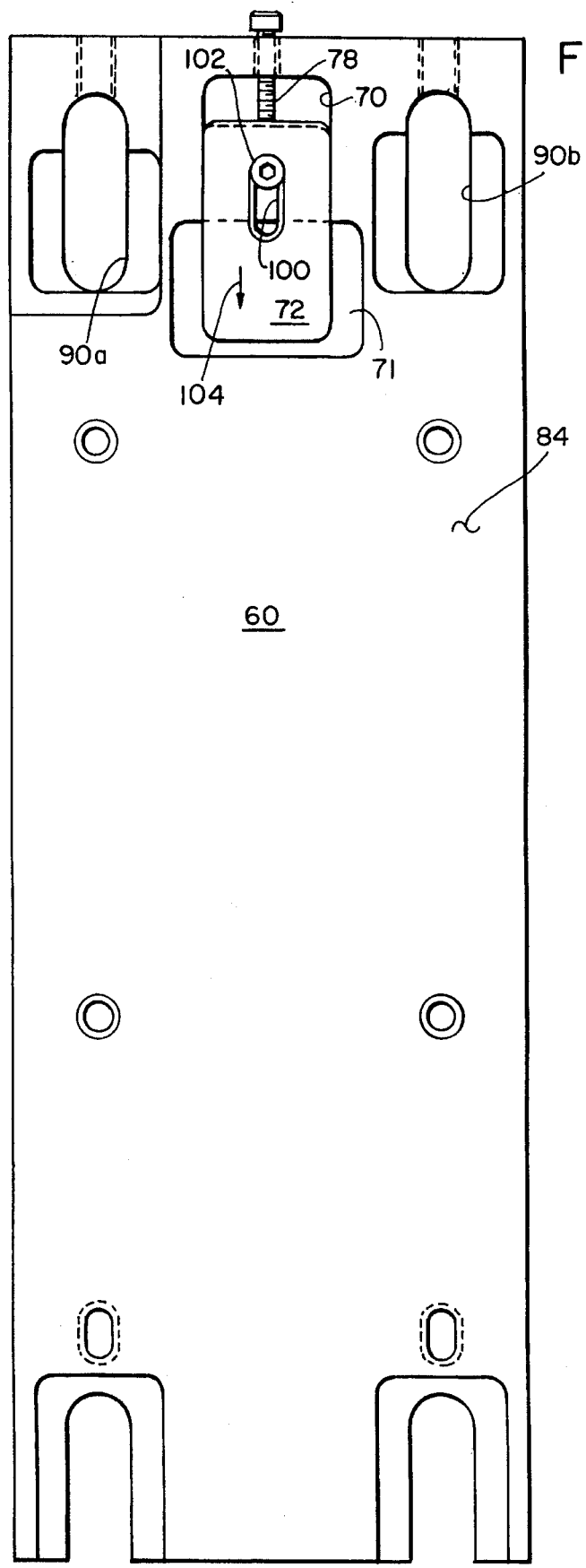
FIG. 3 is a more detailed front view of the back plate according to this invention showing the slide assembly of the neck block adjustment mechanism.

A more detailed view of adjustable back plate 60 is shown in FIG. 3. Pocket 70 is machined in front mold contacting surface 84 of back plate 60 at the location where the neck block will contact the back plate. Tapered plate 72 is secured to move within pocket 70 by means of slot 100 and fastener 102. Driving rod or adjustable bolt 78 then bears down on tapered plate 72 moving it in pocket 70 (slide 72 shown in the full extended position). As it moves downward in the direction shown by arrow 104 the thicker portions of the tapered plate 72 enter behind the neck block moving it or lifting it away from the plane of the back plate thereby aligning an undersized neck block with respect to the mold body block. Or, broad portion 71 of pocket 70 allows the back of the neck block to be set back from the plane of the back plate in the situation where the neck block is oversized and has a greater depth than the body block. This often occurs after the body block wears and is refurbished. Accordingly, the combination of the neck block adjustment mechanism and the pocket allows adjustment of both oversized and undersized neck blocks. This is not, however, a limitation of the present invention.

Vertical adjustment of the back plate 60 is accomplished by means of closed-ended channels 90a and 90b in back plate 60. A bolt with a contact shoe on the terminal end thereof is then assembled to reside in the channels. After the back plate is secured lightly to the platen by means of fasteners inserted through channels 90a and 90b, the contacting shoes are brought to bear down on the fasteners inserted through channels 90a and 90b pushing the back plate up (or down) on the platen aligning it thereon. After alignment is complete, the fasteners are correctly torqued securing the back plate on the platen for molding.

Figure 4:
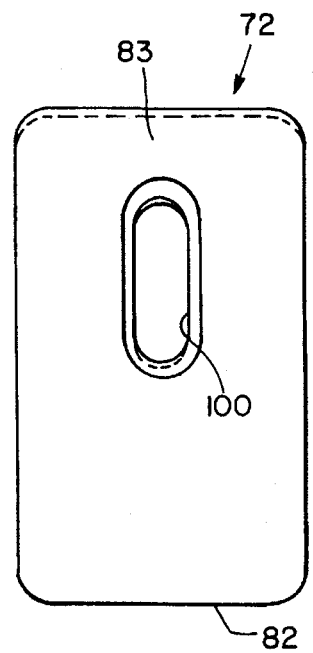
FIG. 4 is a front view of the tapered plate of the slide assembly of FIG. 3.
Figure 5:
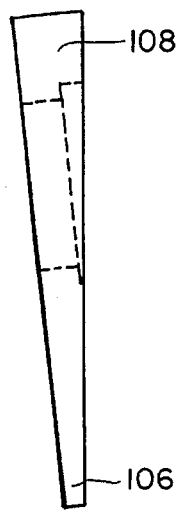
FIG. 5 is a side view of the tapered plate of FIG. 4.

Tapered plate 72 is also shown in FIG. 4 for a back plate for a standard 1 pint, 1 quart, ½ gallon and 1 gallon dairy mold but not limited to these sizes. Bottom edge is 82 is thin as shown at 106, FIG. 5, approximately 0.100" and top edge 84 is thicker as shown at 108, FIG. 5, approximately 0.362". A good length for plate 70 is about 2.5" while the width is 1.5" for a back plate for a half gallon and gallon dairy mold. Obviously, other dimensions are possible.

Figure 6:
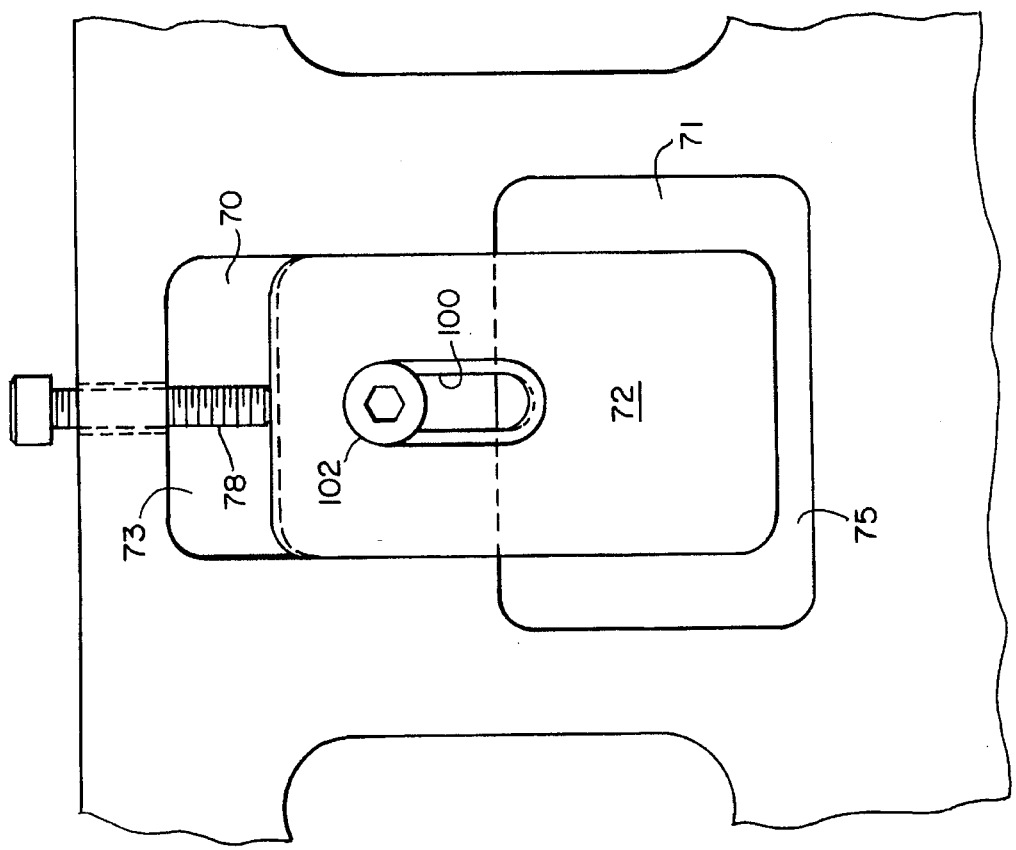
FIG. 6 is a front view of the neck block adjustment mechanism according to this invention.
Figure 7:
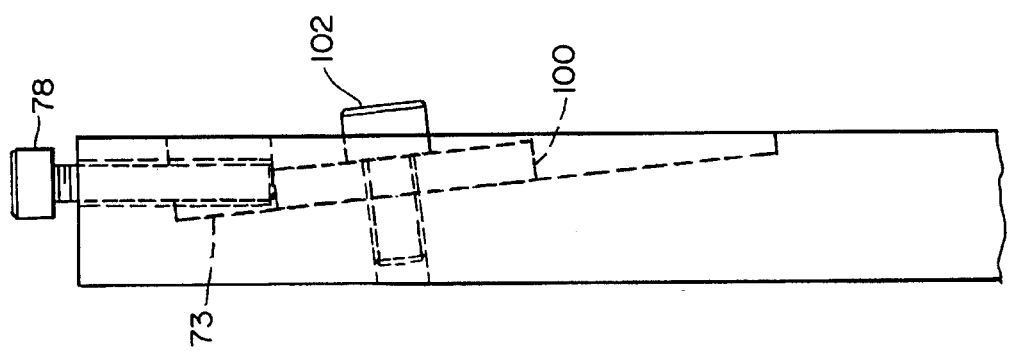
FIG. 7 is a side view of the neck block adjustment mechanism according to this invention.

Installed in pocket 70, FIG. 6, by means of fasteners 102 through slot 100, tapered plate 72 is moved and biased in place by means of adjustment screw 78. Pocket 70 is 1.502" wide by 3.00" long and includes broad portion 71 which is 2.250" wide by approximately 1.625" long. At its deepest point 73, cavity 70 is 0.404" deep while at its shallowest point it is 0.09" deep. This provides a 0.01" adjustment or lift when plate 72 is extended and approximately 0.042" clearance when plate 72 is retracted.

Figure 8:
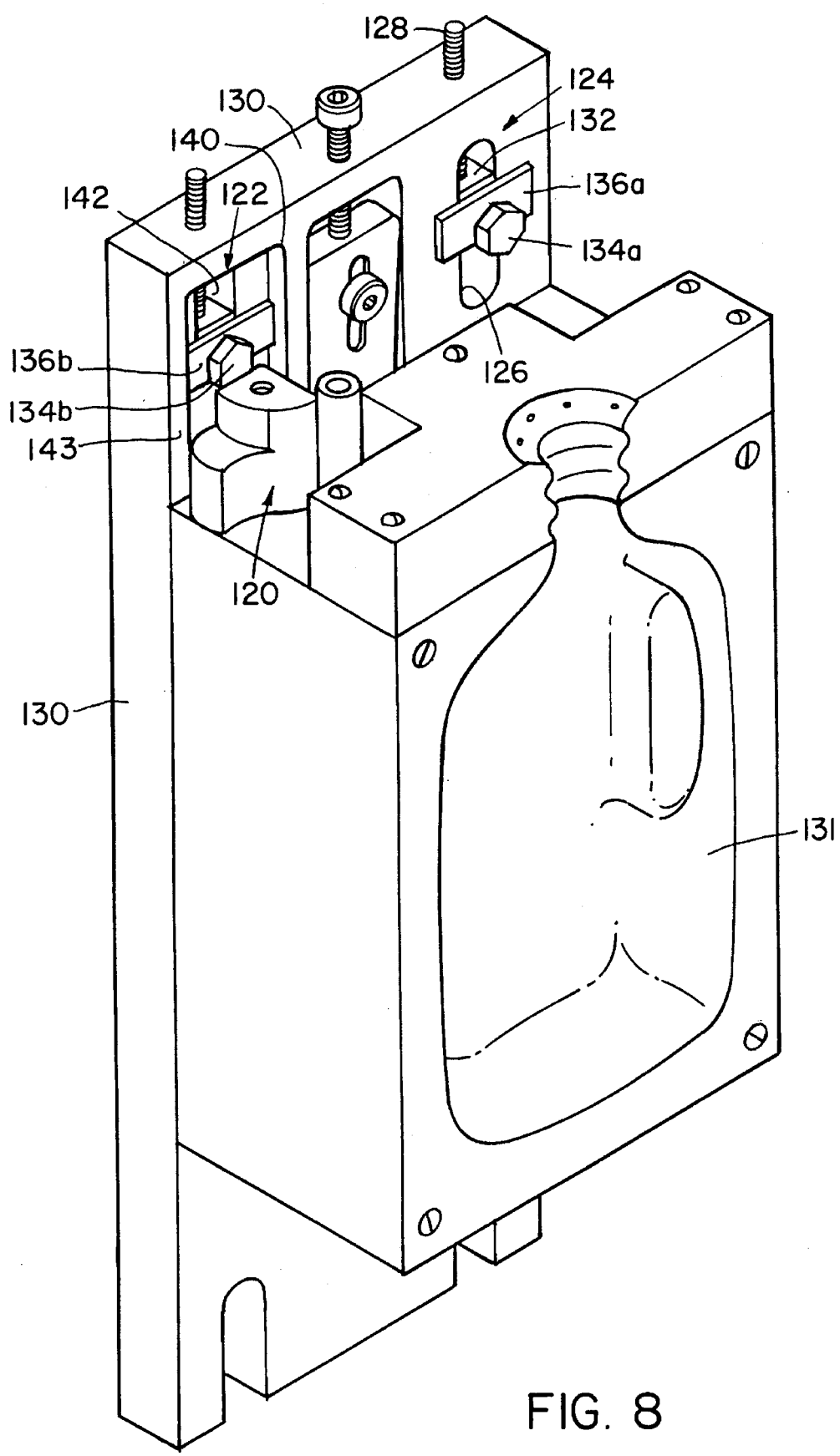
FIG. 8 is a schematic view of another embodiment of the adjustable back plate of this invention for mold body blocks which include a cam lock system.

Some molds have a cam lock system 120, FIG. 8. Accordingly, the left side vertical adjustment mechanism must be configured so that it does not interfere with cam lock system 120. Right side vertical adjustment mechanism 124 includes closed-ended channel 126 and bolt 128 threaded through the top of back plate 130 into channel 126 where shoe 132 is brought to bear on back plate/platen attachment bolt 134. Square washer 136a and bolt 134a would interfere with cam lock system 120, so the left side vertical adjustment mechanism 122 includes recess 140 around closed-ended channel 142 so that square washer 136b and bolt 134 are 0.170" below the front face 142 of back plate 130. This allows a jam nut to slide under the cam lock system without interference.

Regardless of the actual embodiment, the neck block adjustment mechanism positions the neck block relative to the front mold contacting surface of the back plate for aligning the neck block with respect to the mold body block and the vertical adjustment mechanism allows positioning of the back plate on the platen.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. An adjustable back plate for a mold assembly, said mold assembly including a mold body block and a neck block, the adjustable back plate comprising:

a neck block adjustment mechanism engaging the neck block; and means for guiding said neck block adjustment mechanism to allow for alignment of the neck block, with respect to the mold body block.

2. The adjustable back plate of claim 1 in which said means for guiding said neck block adjustment mechanism includes a pocket in the back plate behind the neck block.

3. The adjustable back plate of claim 2 in which said neck block adjustment mechanism includes a slide assembly receivable within said pocket.

4. The adjustable back plate of claim 3 in which said slide assembly includes a pocket insert and means for positioning said insert in a plurality of positions along the length of said pocket behind the neck block.

5. The adjustable back plate of claim 4 in which said insert is a tapered plate and said means for positioning said tapered plate includes a driving rod receivable within said pocket for urging said tapered plate behind the neck block.

6. The adjustable back plate of claim 1 in further including means for vertically adjusting the back plate with respect to a platen.

7. The adjustable back plate of claim 6 in which said means for vertically adjusting includes at least one channel within said back plate and a shaft extendable within said channel.

8. The adjustable back plate of claim 7 further including a contact shoe on a distal end of said shaft in said channel.

9. The adjustable back plate of claim 7 in which said shaft includes a bearing surface.

10. The adjustable back plate of claim 7 further including at least one fastener for securing said back plate to a platen, said fastener receivable though said channel.

11. The adjustable back plate of claim 10 in which said shaft is orientated for bearing on said fastener though said channel.

12. The adjustable back plate of claim 11 in which said shaft includes a contact shoe on the distal end of said shaft for bearing on said fastener though said channel.

13. The adjustable back plate of claim 7 in which said channel in said back plate is recessed for providing clearance for fastener means received though said channel, said fastener means fastening the back plate onto the mold body block.

14. An adjustable back plate for a mold assembly, said mold assembly including a mold body block and a neck block, the adjustable back plate comprising:

neck block adjustment means for aligning the neck block with respect to the mold body block; and means for adjusting the back plate with respect to a platen.

15. The adjustable back plate of claim 14 in which said neck block adjustment means includes a pocket in said back plate behind the neck block for receiving the neck block and offsetting said neck block therein for aligning an oversized neck block with respect to the mold body block.

16. The adjustable back plate of claim 15 in which said neck block adjustment means further includes an adjustable tapered plate movable within said pocket for lifting the neck block with respect to the back plate to align neck block with respect to the mold body block.

17. An adjustable back plate for a mold assembly, said mold assembly including a mold body block and a neck block, the adjustable back plate comprising:

a neck block adjustment mechanism including means for offsetting the neck block relative to the plane of the back plate to align the neck block with respect to the mold body block.

18. The adjustable back plate of claim 17 further including a vertical adjustment mechanism for vertically adjusting the back plate with respect to a platen.

19. The adjustable back plate of claim 17 in which said means for offsetting the neck block includes a pocket machined in a front mold contact surface of the back plate for receiving said neck block therein.

20. The adjustable back plate of claim 19 in which said neck block adjustment mechanism is disposed within said pocket.

21. The adjustable back plate of claim 20 in which said a neck block adjustment mechanism further includes a tapered plate slidable within said pocket for lifting said neck block away from the back plate.

22. An adjustable backplate and mold assembly, said assembly comprising:

a back plate;

a mold body block connectable to said back plate;

a neck block connectable to said mold body block;

said back plate having a neck block adjustment mechanism; said neck block adjustment mechanism engageable with said neck block for aligning said neck block with respect to said mold body block.

\* \* \* \* \*